US011713887B2

(12) United States Patent
Tu et al.

(10) Patent No.: US 11,713,887 B2
(45) Date of Patent: Aug. 1, 2023

(54) HEATING DEVICE

(71) Applicant: University of Science and Technology Beijing, Beijing (CN)

(72) Inventors: Rang Tu, Beijing (CN); Xu Yang, Beijing (CN); Xianzhong Chen, Beijing (CN); Jingjing Gao, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 18/072,862

(22) Filed: Dec. 1, 2022

(65) Prior Publication Data

US 2023/0175705 A1  Jun. 8, 2023

(30) Foreign Application Priority Data

Dec. 8, 2021 (CN) .......................... 202111496433.7

(51) Int. Cl.
| | |
|---|---|
| F24D 3/10 | (2006.01) |
| F24D 19/10 | (2006.01) |
| F24D 13/04 | (2006.01) |
| G05B 19/042 | (2006.01) |

(52) U.S. Cl.
CPC ............. *F24D 3/105* (2013.01); *F24D 13/04* (2013.01); *F24D 19/1012* (2013.01); *F24D 19/1024* (2013.01); *G05B 19/042* (2013.01); *G05B 2219/2614* (2013.01)

(58) Field of Classification Search
CPC ...... F24D 3/105; F24D 13/04; F24D 19/1012; F24D 19/1024; G05B 19/042; G05B 2219/2614
See application file for complete search history.

(56) References Cited

U.S. PATENT DOCUMENTS

| | | | |
|---|---|---|---|
| 5,259,445 A | 11/1993 | Pratt | |
| 2019/0186801 A1* | 6/2019 | Kopko | ................... F25B 23/006 |
| 2021/0317998 A1* | 10/2021 | Barboni | .............. F24D 19/1015 |

FOREIGN PATENT DOCUMENTS

| | | |
|---|---|---|
| CN | 201615545 | 10/2010 |
| CN | 102269444 | 7/2011 |
| CN | 202253967 | 5/2012 |
| CN | 202328466 | 7/2012 |
| CN | 202328518 | 7/2012 |
| CN | 103453571 | 12/2013 |

(Continued)

*Primary Examiner* — Michael W Choi
(74) *Attorney, Agent, or Firm* — Stuart H. Mayer; Mayer & Williams PC

(57) ABSTRACT

Disclosed is a heating device, including a first and second ends of an indoor water supply pipe communicated with a main water supply pipe and a water supply end of a radiator; a valve, a first temperature sensor, a heating and control module and a third temperature sensor arranged between the first and second ends; two ends of the heating and control module connected with a bypass pipe; a first and second ends of an indoor return water pipe communicated with a main return water pipe and a return water end of the radiator; a three-way valve and a second temperature sensor arranged between the first end and the second end of the indoor return water pipe; and a first and second ends of the water pump communicated with a third end of the three-way valve and the indoor water supply pipe.

10 Claims, 5 Drawing Sheets

(56) References Cited

FOREIGN PATENT DOCUMENTS

| | | |
|---|---|---|
| CN | 204176722 | 2/2015 |
| CN | 104848294 | 8/2015 |
| CN | 206222443 | 6/2017 |
| CN | 108954491 | 12/2018 |
| CN | 109297336 | 2/2019 |
| CN | 109708188 | 5/2019 |
| CN | 110145785 | 8/2019 |
| CN | 209415550 | 9/2019 |
| CN | 110736129 | 1/2020 |
| CN | 211625720 | 10/2020 |
| CN | 112240593 | 1/2021 |
| CN | 212566277 | 2/2021 |
| CN | 112856571 | 5/2021 |
| CN | 213178569 | 5/2021 |
| CN | 214664752 | 11/2021 |
| DE | 19602388 | 7/1997 |
| JP | 2006057986 | 3/2006 |
| JP | 2006200755 | 8/2006 |
| KR | 101782592 | 9/2017 |
| WO | 2014161505 | 10/2014 |
| WO | 2016047930 | 3/2016 |
| WO | 2017111364 | 6/2017 |

\* cited by examiner

HEATING DEVICE

CROSS-REFERENCE TO RELATED APPLICATIONS

This application claims priority to Chinese Patent Application No. 202111496433.7, filed on Dec. 8, 2021, the entire contents of which are incorporated herein by reference.

TECHNICAL FIELD

The present application generally relates to energy and air conditioning, and in particular to a heating device.

BACKGROUND

Central heating is a main heating mode in cities and towns of northern China in winter. However, the existing central heating mode has some problems, such as difficulty in adjusting hydraulic and thermal conditions, large heat loss in pipe networks and users, uneven heat and cold at ends of heating, low satisfaction rates of the users and high cost, so it is relatively robust.

Moreover, in actual heating processes, the existing robust central heating mode may not meet individual needs of the different users due to different thermal loads of the different users, different heating temperature demands of the users of different ages as well as genders, and different water supply temperatures under different outdoor temperatures.

Therefore, it is urgent for providing a heating method that may meet the individual needs of the users for heating and combine low-temperature central heating with indoor decentralized heat regulation regulated in a whole heating season.

SUMMARY

An objective of the application is to provide a heating device, which may meet individual needs of users for heating and may combine low-temperature central heating with indoor decentralized heat regulation regulated in a whole heating season.

To achieve the above objective, the present application adopts the following technical schemes.

A heating device includes a heating and control module, a bypass pipe, three temperature sensors (a first temperature sensor, a second temperature sensor and a third temperature sensor), a water pump, a valve, a three-way valve, a main water supply pipe, a main return water pipe, an indoor water supply pipe and an indoor return water pipe;

a first end of the indoor water supply pipe is communicated with the main water supply pipe; a second end of the indoor water supply pipe is communicated with a water supply end of a radiator; the valve, the first temperature sensor, the heating and control module and the third temperature sensor are arranged between the first end and the second end of the indoor water supply pipe in sequence; and two ends of the heating and control module are connected with the bypass pipe in parallel;

a first end of the indoor return water pipe is communicated with the main return water pipe; a second end of the indoor return water pipe is communicated with a return water end of the radiator; and the three-way valve and the second temperature sensor are arranged between the first end and the second end of the indoor return water pipe in sequence;

a third end of the three-way valve is communicated with a first end of the water pump, and a second end of the water pump is communicated with the indoor water supply pipe between the first temperature sensor and the heating and control module.

Further, the heating and control module is used for collecting outdoor temperature, indoor control temperature and measured values of the first temperature sensor, the second temperature sensor and the third temperature sensor; the heating and control module is also used for controlling starting of heating function, heating power, the rotating speed of the water pump, opening and closing of the valve and opening and closing of the three-way valve through an internal optimization algorithm.

Further, the heating device at least includes a low-temperature mode, a heat-up mode and a heat-control mode.

Further, when the heating and control module is turned off, the valve is opened and the water pump is turned off, water from the main water supply pipe flowing in the indoor water supply pipe flows through the bypass pipe, and the heating device is in the low-temperature mode.

Further, when the heating and control module is turned on, the valve is opened, the water pump is turned off, and temperature at the second temperature sensor is lower than temperature at the first temperature sensor, the water from the main water supply pipe flowing in the indoor water supply pipe flows through the bypass pipe, and the heating device is in the heat-up mode.

Further, when the heating and control module is turned on, the valve is closed, the water pump is turned on, and the temperature at the second temperature sensor is higher than the temperature at the first temperature sensor, the water in the main water supply pipe may not flow into the indoor water supply pipe, and the heating device performs indoor self-circulation and is in the heat-control mode.

Further, heating modes of the heating and control module include at least one of electric heating, photovoltaic panels electrical storage heating or storage battery heating.

Effects of the present application are as follows:

the heating device includes the heating and control module, the bypass pipe, the three temperature sensors, the water pump, the valve, the three-way valve, the main water supply pipe, the main return water pipe, the indoor water supply pipe and the indoor return water pipe. The heating and control module, the bypass pipe, the three temperature sensors, the water pump, the valve and the three-way valve combine the low-temperature central heating regulated in the whole heating season with the indoor decentralized heat regulation, and control the heating device to switch to different working conditions. The different heating modes of the heating device under the different working conditions bring different heating effects, so as to meet the individual needs of the different users for heating.

DETAILED DESCRIPTION OF THE EMBODIMENTS

The technical schemes of the present application are clearly and completely described below with reference to the drawings and embodiments.

The embodiments of the application provide a personalized heating device, which meets individual needs of users, combines low-temperature central heating regulated in a whole heating season with indoor decentralized heat regulation, and is applicable to an all users' parallel central heating system. Firstly, on the basis of the original central heating system, a central heating temperature is reduced to a basic heating temperature, such as an anti-freezing temperature for a heating pipe network or an indoor non-working time heating temperature; then, a heat regulator, namely a heating and control module, is installed on an indoor water supply pipe of each heat user, in which the heat regulator may adopt various energy forms, such as electricity or gas. The users set an indoor temperature according to their needs, and the heat regulator heats water to a required water supply temperature according to an instruction of the indoor temperature set by the users, so as to meet individual heating demands of the different heat users. When the users are not at home, the heat regulator is turned off, and low-temperature hot water in a heating pipe network is used for heating, so as to meet indoor anti-freezing or minimum heating demands.

When the heating device provided by the application is used for heating, only basic heating cost of the central heating is charged to the users, and each user bears own energy consumption cost of the heat regulator. As the water supply temperature of the central heating is greatly reduced, low-temperature waste heat may be used instead of the gas or coal as a heat source, thus greatly reducing the heating cost. Therefore, the heating device not only reduces the energy consumption of the central heating, but also stimulates enthusiasm of the users to save energy and further reduces the overall energy consumption for heating. In addition, the heating device may also be used in combination with solar photovoltaic panels and household electrical storage devices. In peak periods of thermal loads, the heat regulator uses electric energy from the solar photovoltaic panels, which makes full use of natural energy and further reduces the energy consumption and carbon emissions for heating. Moreover, due to the high thermal loads and low electricity load at night, but the low thermal loads and the high electricity load during the day, if the heat regulator is powered by a power grid, a peak-valley difference between day and night of the power grid may be effectively reduced.

With reference to the drawings, the heating device of the present application is explained in detail through the following embodiments.

Figure 1:
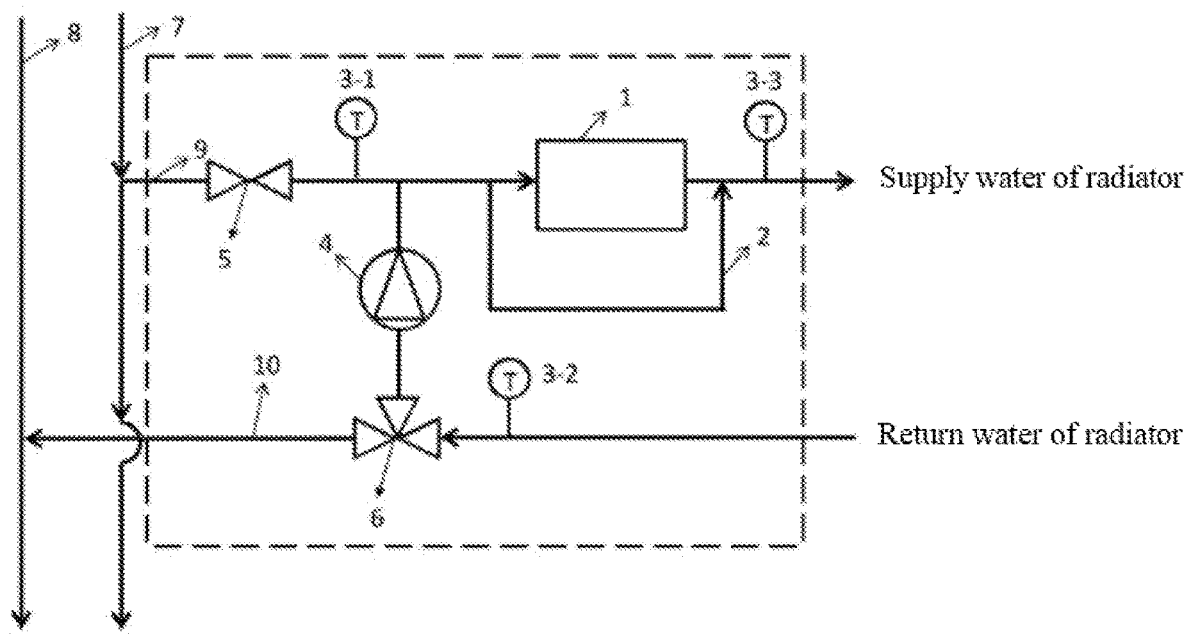
FIG. 1 is a schematic structural diagram of a heating device of the present application.

FIG. 1 is a schematic structural diagram of the heating device of the present application.

One embodiment of the application provides an indoor personalized temperature-controlling heating device combined with the low-temperature central heating system. As shown in FIG. 1, the heating device of the embodiment includes a heating and control module 1, a bypass pipe 2, three temperature sensors, a water pump 4, a valve 5, a three-way valve 6, a main water supply pipe 7, a main return water pipe 8, the indoor water supply pipe 9 and an indoor return water pipe 10, in which the three temperature sensors are a first temperature sensor 3-1, a second temperature sensor 3-2 and a third temperature sensor 3-3. A first end of the indoor water supply pipe 9 is communicated with the main water supply pipe 7; a second end of the indoor water supply pipe 9 is communicated with a water supply end of a radiator; the valve 5, the first temperature sensor 3-1, the heating and control module 1 and the third temperature sensor 3-3 are arranged between the first end and the second end of the indoor water supply pipe 9 in sequence; and two ends of the heating and control module 1 are connected with the bypass pipe 2 in parallel.

A first end of the indoor return water pipe 10 is communicated with the main return water pipe 8; a second end of the indoor return water pipe 10 is communicated with a return water end of the radiator; and the three-way valve 6 and the second temperature sensor 3-2 are arranged between the first end and the second end of the indoor return water pipe 10 in sequence. To be clear, the radiator is not shown in FIG. 1, the water supply end of the radiator is communicated with the second end of the indoor water supply pipe 9, and the return water end of the radiator is communicated with the second end of the indoor return water pipe 10.

A first end of the three-way valve 6 is communicated with the first end of the indoor return water pipe 8, a second end of the three-way valve 6 is communicated with the second end of the indoor return water pipe 8, a third end of the three-way valve 6 is communicated with a first end of the water pump 4, and a second end of the water pump 4 is communicated with the indoor water supply pipe 9 between the first temperature sensor 3-1 and the heating and control module 1.

The heating and control module 1 of the embodiment is used for collecting an outdoor temperature, an indoor control temperature and measured values of the first temperature sensor 3-1, the second temperature sensor 3-2 and the third temperature sensor 3-3. The first temperature sensor 3-1 is used for monitoring the water supply temperature of the central heating, the second temperature sensor 3-2 is used for monitoring a return water temperature of an indoor heating system, and the third temperature sensor 3-3 is used for monitoring supply water temperature of the indoor heating system.

The heating and control module 1 is also used for controlling starting of heating function, heating power, rotating speed of the water pump 4, opening and closing of the valve 5 as well as opening and closing of the three-way valve 6 through an internal optimization algorithm.

The main water supply pipe 7, the main return water pipe 8, the indoor water supply pipe 9 and the indoor return water pipe 10 is a traditional pipe network. On the basis of the traditional pipe network, the heating device of the embodiment is additionally provided with a personalized water temperature control module at an entry side to home. The personalized water temperature control module includes the heating and control module 1, the bypass pipe 2, the three temperature sensors (the first temperature sensor 3-1, the second temperature sensor 3-2 and the third temperature sensor 3-3), the water pump 4, the valve 5 and the three-way valve 6. The heating and control module 1 may automatically collect the outdoor temperature (the outdoor temperature is collected by an outdoor air temperature sensor), the indoor control temperature (the indoor control temperature is set by the users and collected by an indoor temperature control panel) and the measured values of the first temperature sensor 3-1, the second temperature sensor 3-2 and the third temperature sensor 3-3, namely the temperatures.

Moreover, the heating and control module 1 also controls the starting of the heating function, the heating power, the rotating speed of the water pump 4, the opening and closing of the valve 5 as well as the opening and closing of the three-way valve 6 through the internal optimization algorithm, so that the actual indoor temperature meets the individual needs of the users.

In addition, the heating and control module 1 has a built-in Artificial Intelligence (AI) algorithm for accurately, quickly and efficiently controlling an indoor decentralized heat regulation system through machine learning based on the indoor temperature set by the users, the outdoor temperature and the water supply temperature of the central heating system.

The heating device of the embodiment is suitable for at least two working conditions, and the two working conditions may be subdivided into three modes, namely, a low-temperature mode, a heat-up mode and a heat-control mode. An operating principle for the heating device is described below based on the three modes under the two working conditions respectively.

Figure 2:
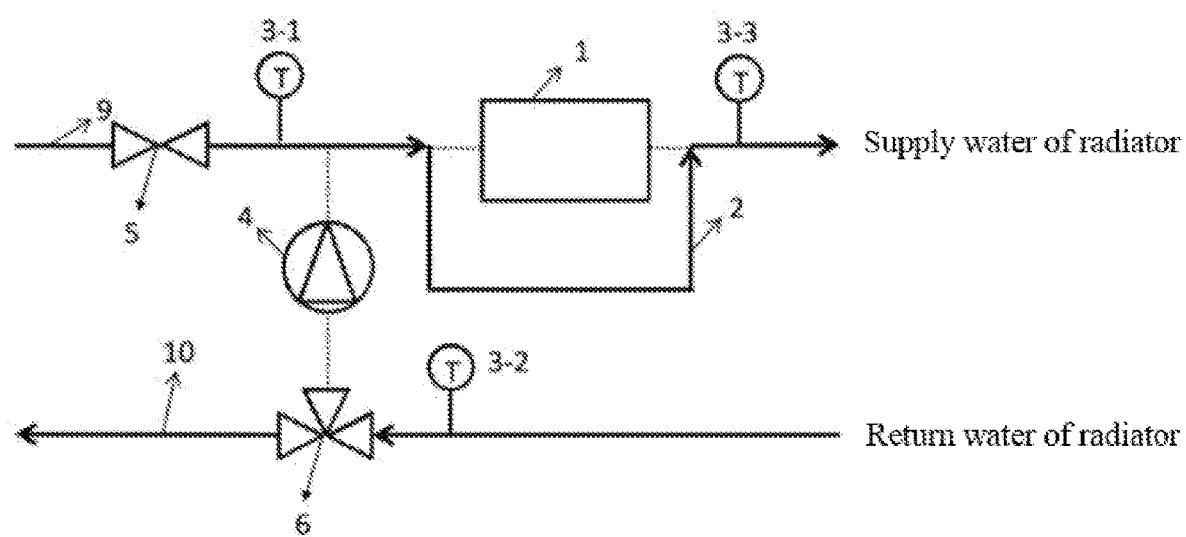
FIG. 2 shows a water flowing direction of a heating device in a low-temperature mode in an embodiment of the application.

FIG. 2 shows a water flowing direction of the heating device in the low-temperature mode in an embodiment. Next, the operating principle of the heating device in the low-temperature mode under the working condition 1 is explained with reference to FIG. 2.

In practical application, if the users are not at home or want to keep the lowest indoor temperature, the heating device may be switched to the low-temperature mode.

Specifically, the users turn off the heating and control module 1 in the heating device, then the heating device directly uses the low-temperature hot water in the central heating system to maintain the lowest indoor temperature, that is, the heating and control module 1 is turned off, the valve 5 is opened and the water pump 4 is turned off, water from the main water supply pipe 7 flowing in the indoor water supply pipe 9 flows through the bypass pipe 2, and the heating device is in the low-temperature mode.

The water in the main water supply pipe 7 flows into the indoor water supply pipe 9, the water in the indoor water supply pipe 9 flows into the radiator through the bypass pipe 2 via the third temperature sensor 3-3, the water flows into the main return water pipe 8 through the indoor return water pipe 10 communicated with the radiator, and the radiator maintains the lowest indoor temperature through the water from the main water supply pipe 7. In the low-temperature mode, since the heating and control module 1 and the water pump 4 are turned off, the energy consumption is saved.

Figure 3:
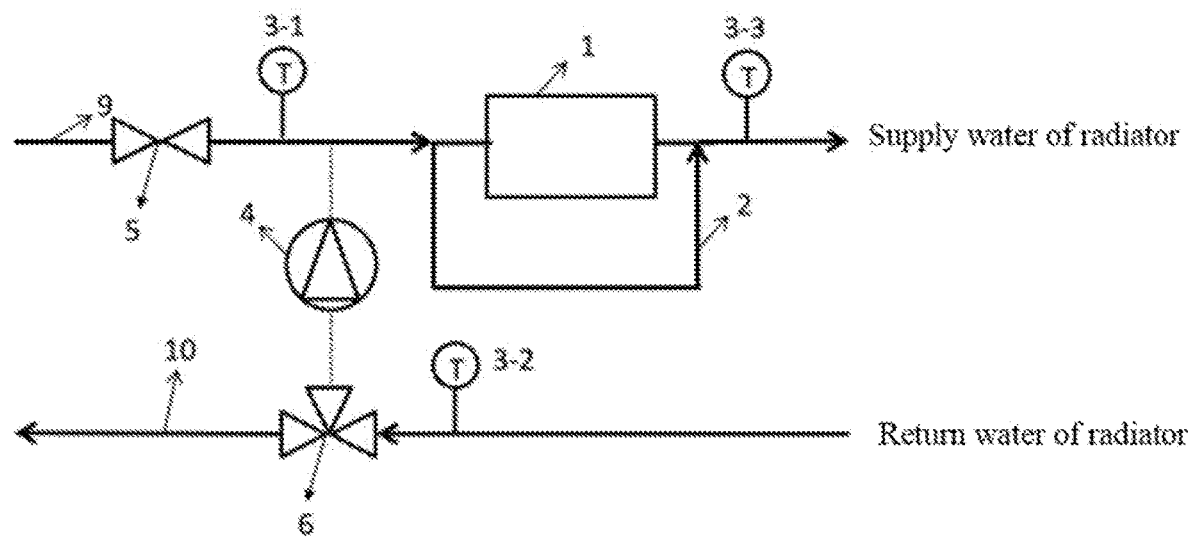
FIG. 3 shows a water flowing direction of a heating device in an external circulation heat-up mode of the present application.
Figure 4:
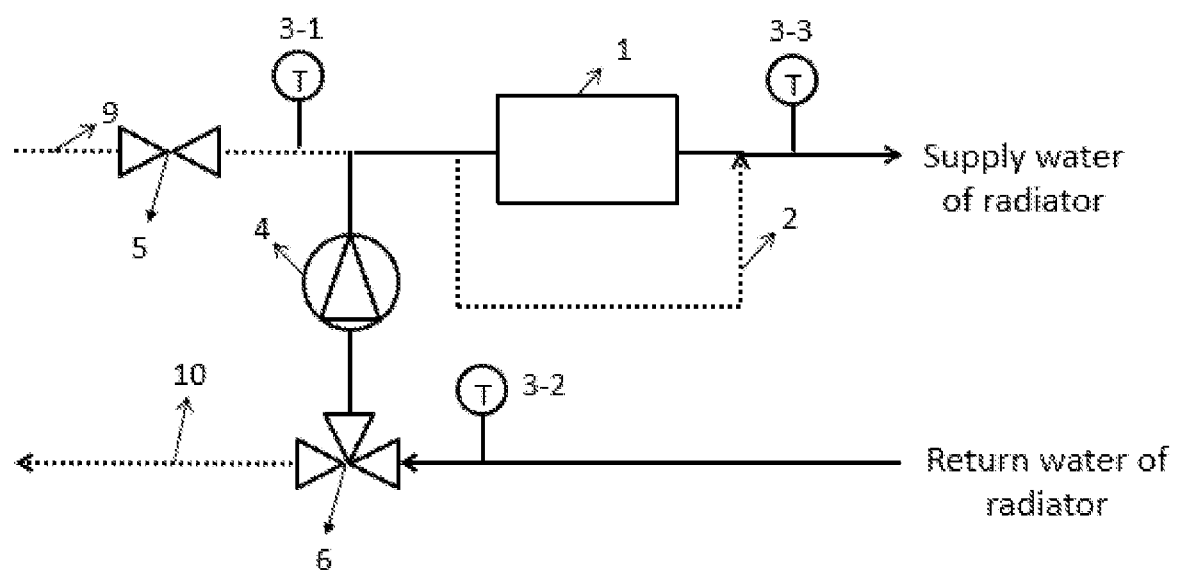
FIG. 4 shows a water flowing direction of a heating device in a self-circulation heat-control mode of the present application.

FIG. 3 shows the water flowing direction of the heating device in the heat-up mode in an embodiment of the present application. FIG. 4 shows the water flowing direction of the heating device in the heat-control mode in an embodiment of the present application.

The operating principle of the heating device in the external circulation heat-up mode and the self-circulation heat-control mode under the working condition 2 is explained below with reference to FIG. 3 and FIG. 4.

It should be noted that solid lines in FIG. 2-FIG. 4 indicate that the water may flow through, while dotted lines indicate that the water may not flow through.

In practical application, when the users are at home and raise the set indoor temperature, but the heating demand may not be met only by the central heating system, the heating and control module 1 is turned on, all or part of water flows through the heating and control module 1, and the other part of water flows through the bypass pipe 2. After the water flowing through the heating and control module 1 and the water flowing through the bypass pipe 2 are mixed, temperature at the third temperature sensor 3-3 meets personalized water supply temperature demand of the users.

As shown in FIG. 3, when the heating and control module 1 is turned on, the valve 5 is opened, the water pump 4 is turned off, and temperature at the second temperature sensor 3-2 is lower than temperature at the first temperature sensor 3-1, part of the water from the main water supply pipe 7 flowing in the indoor water supply pipe 9 flows through the heating and control module 1, the other part of the water flows through the bypass pipe 2, and the heating device is in the heat-up mode.

In the heat-up mode, the heating and control module 1 and the low-temperature hot water of the central heating system jointly supply heat for the radiator to raise the indoor temperature.

When the indoor temperature rises to the temperature set by the users, the heating device enters the heat-control mode. As shown in FIG. 4, when the heating and control module 1 is turned on, the valve 5 is closed, the water pump 4 is turned on, and the temperature at the second temperature sensor 3-2 is higher than the temperature at the first temperature sensor 3-1, the water in the main water supply pipe 7 may not flow into the indoor water supply pipe 9, and the heating device performs indoor self-circulation and is in the heat-control mode.

As the valve 5 is closed, the water from the main water supply pipe 7 may not flow into the indoor radiator through the indoor water supply pipe 9. At this time, the heating and control module 1 provides heat energy, and the heating and control module 1 and the water pump 4 maintain indoor self-circulation.

In practical application, heating modes of the heating and control module 1 includes at least one of electric heating, photovoltaic panels electrical storage heating or battery heating. Electricity consumption of the heating and control module 1 comes from the power grid or an indoor solar energy storage module, so the heating cost is reduced.

In an aspect of operation control, firstly, the heating and control module 1 performs data-driven dynamic prediction of the thermal loads based on the collected indoor temperature, the outdoor temperature and other operation data combined with a building thermal balance mechanism, including taking building operation data and historical thermal load data as an input matrix and future thermal load data as an output matrix; standardizing the input matrix and the output matrix; inputting the standardized input matrix and the standardized output matrix into a Bayesian network for training; using a Gaussian mixture model to approximate a joint probability density distribution function in a Bayesian network model; solving parameters of the Gaussian mixture model by an Expectation Maximization Algorithm to obtain a Bayesian network estimation formula; and further determining the real-time predicted values of the thermal loads. Then, according to the predicted values of the thermal loads, the heating power of the heater, the rotating speed of the water pump 4, etc. are taken as control input values of an indoor decentralized heat regulation system; the indoor temperature of the users is taken as output values of the indoor decentralized heat regulation system; the outdoor temperature, the supply water temperature of the central heating pipe network (the temperature at the first temperature sensor 3-1), the return water temperature of the indoor heating system (the temperature at the second temperature sensor 3-2) and the water supply temperature of the indoor heating system (the temperature at the third temperature sensor 3-3) are taken as process variables of the indoor decentralized heat regulation system; a subspace predictive function related to an indoor decentralized heat regulation system model is deduced and established through a data-driven subspace prediction and control method and by using collected data of the control input values and the output values as input/output data and a subspace identification technology, so as to determine influences of the heating power of the indoor decentralized heat regulation system and the rotating speed of water pump 4 on the indoor temperature of the users. Finally, a performance index function composed of the electricity consumption and the indoor temperature of the users is taken as a control objective function of a subspace predictive controller; the control objective function is solved to obtain the control input values of the subspace predictive controller, then the heating power of the indoor decentralized heat regulation system as well as the rotating speed of the water pump 4 are regulated and controlled, so that the indoor temperature reaches the temperature set by the users under the condition of reducing the electricity consumption as much as possible.

Figure 5:
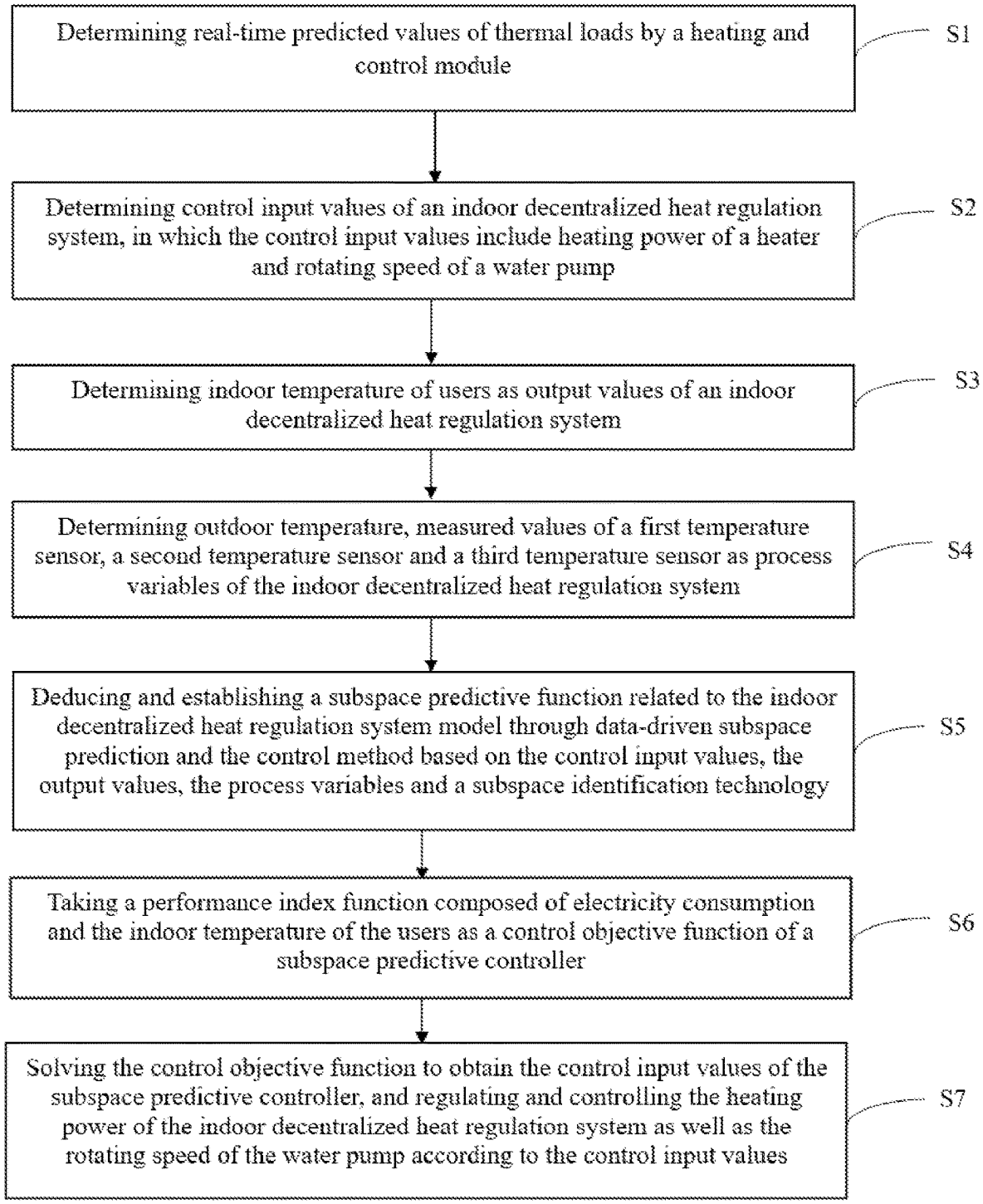
FIG. 5 is a flowchart of an operation control method executed by a heating and control module of the present application.

As shown in FIG. 5, in an optional embodiment, an operation control method executed by the heating and control module 1 includes:

S1: determining the real-time predicted values of the thermal loads by the heating and control module 1;

the heating and control module 1 performs the data-driven dynamic prediction of the thermal loads based on the collected operation data and the building thermal balance mechanism, and determines the real-time predicted values of the thermal loads;

further, determining the real-time predicted values of the thermal loads by the heating and control module 1 includes: taking the building operation data and the historical thermal load data as the input matrix and future thermal load data as the output matrix; standardizing the input matrix and the output matrix; inputting the standardized input matrix and the standardized output matrix into the Bayesian network for training, using the Gaussian mixture model to approximate the joint probability density distribution function in the Bayesian network model, and solving the parameters of the Gaussian mixture model by the Expectation Maximization Algorithm to obtain the Bayesian network estimation formula; and determining the real-time predicted values of the thermal loads according to the Bayesian network estimation formula.

S2: determining the control input values of the indoor decentralized heat regulation system, in which the control input values include the heating power of the heater and the rotating speed of the water pump 4;

S3: determining the indoor temperature of the users as the output values of the indoor decentralized heat regulation system;

S4: determining the outdoor temperature, measured values of the first temperature sensor 3-1, the second temperature sensor 3-2 and the third temperature sensor 3-3 as the process variables of the indoor decentralized heat regulation system;

S5: deducing and establishing the subspace predictive function related to the indoor decentralized heat regulation system model through the data-driven subspace prediction and the control method based on the control input values, the output values, the process variables and the sub space identification technology, in which the subspace predictive function represents a relationship between the heating power of the indoor decentralized heat regulation system, the rotating speed of the water pump 4 and the indoor temperature of the users;

S6: taking the performance index function composed of the electricity consumption and the indoor temperature of the users as the control objective function of the subspace predictive controller;

S7: solving the control objective function to obtain the control input values of the subspace predictive controller, and regulating and controlling the heating power of the indoor decentralized heat regulation system as well as the rotating speed of the water pump 4 according to the control input values.

According to the heating device of the application, the heating and control module 1 may flexibly adjust the indoor temperature, meet the individual heating demand of the different users, and reduce the energy consumption of the central heating and the heating cost of the users.

It should be noted that in the application, the term "comprising", "including" or any other variation thereof is intended to cover non-exclusive inclusion, so that a process, a method, an article or a device not only includes those listed elements, but also includes other elements not explicitly listed. Without further restrictions, the process, the method, the article or the device may include identical elements.

It should be understood that the technical schemes of the present application are not limited to the limits of the above specific embodiments, and any technical variations made according to the technical schemes of the present application, without departing from the scope protected by the objective and claims of the present application, fall within the scope of protection of the present application.

What is claimed is:

1. A heating device, comprising a heating and control module, a bypass pipe, three temperature sensors, a water pump, a valve, a three-way valve, a main water supply pipe, a main return water pipe, an indoor water supply pipe and an indoor return water pipe;

wherein:

a first end of the indoor water supply pipe is communicated with the main water supply pipe; a second end of the indoor water supply pipe is communicated with a water supply end of a radiator; the valve, a first temperature sensor, the heating and control module and a third temperature sensor are arranged between the first end and the second end of the indoor water supply pipe in sequence; and two ends of the heating and control module are connected with the bypass pipe in parallel;

a first end of the indoor return water pipe is communicated with the main return water pipe; a second end of the indoor return water pipe is communicated with a return water end of the radiator; and the three-way valve and a second temperature sensor are arranged between the first end and the second end of the indoor return water pipe in sequence; and a third end of the three-way valve is communicated with a first end of the water pump, and a second end of the water pump is communicated with the indoor water supply pipe between the first temperature sensor and the heating and control module.

2. The heating device according to claim 1, wherein the heating and control module is used for collecting outdoor temperature, indoor control temperature and measured values of the first temperature sensor, the second temperature sensor and the third temperature sensor; and the heating and control module is also used for controlling starting of heating function, heating power, rotating speed of the water pump, opening and closing of the valve and opening and closing of the three-way valve through an internal optimization algorithm.

3. The heating device according to claim 1, wherein the heating device at least comprises a low-temperature mode, a heat-up mode and a heat-control mode.

4. The heating device according to claim 3, wherein when the heating and control module is turned off, the valve is opened and the water pump is turned off, water from the main water supply pipe flowing in the indoor water supply pipe flows through the bypass pipe, and the heating device is in the low-temperature mode.

5. The heating device according to claim 3, wherein when the heating and control module is turned on, the valve is opened, the water pump is turned off, and temperature at the second temperature sensor is lower than temperature at the first temperature sensor, water from the main water supply pipe flowing in the indoor water supply pipe flows through the bypass pipe, and the heating device is in the heat-up mode.

6. The heating device according to claim 3, wherein when the heating and control module is turned on, the valve is closed, the water pump is turned on, and temperature at the second temperature sensor is higher than temperature at the first temperature sensor, water in the main water supply pipe may not flow into the indoor water supply pipe, and the heating device performs indoor self-circulation and is in the heat-control mode.

7. The heating device according to claim 1, wherein heating modes of the heating and control module comprise at least one of electric heating, photovoltaic panels electrical storage heating or storage battery heating.

8. The heating device according to claim 1, wherein the heating and control module determines real-time predicted values of thermal loads,
determines control input values of an indoor decentralized heat regulation system, wherein the control input values comprise heating power of a heater and rotating speed of the water pump, determines indoor temperature of users as output values of the indoor decentralized heat regulation system,
determines outdoor temperature, measured values of the first temperature sensor, the second temperature sensor and the third temperature sensor as process variables of the indoor decentralized heat regulation system,
deduces and establishes a subspace predictive function related to an indoor decentralized heat regulation system model through a data-driven subspace prediction and control method based on the control input values, the output values, the process variables and a subspace identification technology, wherein the subspace predictive function represents a relationship between heating power of the indoor decentralized heat regulation system, the rotating speed of the water pump and the indoor temperature of the users,
takes a performance index function composed of electricity consumption and the indoor temperature of the users as a control objective function of a subspace predictive controller, solves the control objective function to obtain control input values of the subspace predictive controller, and regulates and controls the heating power of the indoor decentralized heat regulation system as well as the rotating speed of the water pump according to the control input values.

9. The heating device according to claim 8, wherein the heating and control module performs data-driven dynamic prediction of the thermal loads based on collected operation data and a building thermal balance mechanism, and determines the real-time predicted values of the thermal loads.

10. The heating device according to claim 9, wherein determining the real-time predicted values of the thermal loads by the heating and control module comprises:
taking building operation data and historical thermal load data as an input matrix and future thermal load data as an output matrix;
standardizing the input matrix and the output matrix;
inputting the standardized input matrix and the standardized output matrix into a Bayesian network for training, using a Gaussian mixture model to approximate a joint probability density distribution function in a Bayesian network model, and solving parameters of the Gaussian mixture model by an Expectation Maximization Algorithm to obtain a Bayesian network estimation formula; and
determining the real-time predicted values of the thermal loads according to the Bayesian network estimation formula.

* * * * *